United States Patent [19]
Ferrara

[11] Patent Number: 5,422,937
[45] Date of Patent: Jun. 6, 1995

[54] REMOTELY CONTROLLED TELEPHONE OPERATOR SIMULATOR

[76] Inventor: George Ferrara, 8213 E. LaJunta Rd., Scottsdale, Ariz. 85255

[21] Appl. No.: 101,296

[22] Filed: Aug. 3, 1993

[51] Int. Cl.⁶ .................... H04M 1/64; H04M 3/54
[52] U.S. Cl. ........................... 379/88; 379/76; 379/70; 379/67; 379/212; 379/214
[58] Field of Search .............. 379/70, 74, 76, 77, 379/79, 87, 88, 211, 212, 213, 214, 67, 201

[56] References Cited

U.S. PATENT DOCUMENTS

| | | | |
|---|---|---|---|
| 1,934,949 | 11/1933 | Powell | 379/214 |
| 4,623,761 | 11/1986 | Winter | 379/84 |
| 4,697,282 | 4/1987 | Winter | 379/67 |
| 4,734,930 | 3/1988 | Quiros | 379/88 |
| 4,811,381 | 3/1989 | Woo | 379/67 |
| 4,813,070 | 3/1989 | Humphreys et al. | 379/88 X |
| 4,903,289 | 2/1990 | Hashimoto | 379/88 X |
| 4,941,203 | 7/1990 | Patsiokas et al. | 379/88 X |
| 5,058,152 | 10/1991 | Solomon | 379/67 |
| 5,181,237 | 1/1993 | Dowden | 379/88 |
| 5,189,692 | 2/1993 | Ferrara | 379/88 |

*Primary Examiner*—James L. Dwyer
*Assistant Examiner*—Daniel S. Hunter
*Attorney, Agent, or Firm*—LaValle D. Ptak

[57] ABSTRACT

A remotely controlled telephone operator simulator includes a microprocessor control circuit for supplying digitally recorded voice messages and non-voice messages, as initial "answers" to an incoming telephone call, which is automatically "call forwarded" to a remote telephone set. When the call is received at the remote telephone set, the user supplies tone signals back to the initial called line. Duplexer circuits and a two-input multiplex circuit are provided to prevent these tone signals from being heard by the calling party on the first line. The tone signals, however, do cause operation of the microprocessor control circuit, to cause selected ones of the voice and non-voice messages to be supplied through the multiplex circuit to the calling line. After the desired number of these stored messages are supplied, the microprocessor control circuit switches the multiplex circuit from response to the stored messages to "live" outgoing conversation from the second telephone line. Normal two-way telephone conversation takes place between the called party and the calling party during the remainder of the call.

14 Claims, 1 Drawing Sheet

REMOTELY CONTROLLED TELEPHONE OPERATOR SIMULATOR

DISCLOSURE DOCUMENT

This application is based on Disclosure Document No. 320643, filed in the United States Patent Office on Nov. 16, 1992.

BACKGROUND

Automatic and semi-automatic systems have been developed for interfacing with telephone lines to assist both called and calling parties in the exchange of information. One of the most basic systems is a "telephone answering machine", in which an automatic machine continuously monitors the incoming telephone line. When a ring signal is detected, the system causes the called party telephone to go "off-hook"; and a pre-recorded short message (the answer) usually is played from an endless tape to provide the calling party with a message. At the sound of a tone, the calling party is invited to leave a message, which then is recorded on another tape in the machine. The user of such an answering machine then may play back the messages which have accumulated over the period of time the machine has been operated. A variation of the telephone answering machine is now provided in a central system, controlled by the telephone company. The operation of the system, however, is similar to that of a dedicated telephone answering machine.

Another type of automated answering system currently is in relatively widespread use. This type of answering system is used to replace operators at large corporations and the like. The automated systems provide the calling party with an initial message, and typically then invite the calling party to depress selected ones of the push-buttons on a touch-tone telephone to direct the call to specific departments, or the like, where the telephone finally is answered by a person most likely to be able to communicate with the calling party in the area of interest. It is to be noted that these systems essentially operate under the direction of the calling party, who provides tones in response to the recorded prompt, for directing the call to the telephone which ultimately is to be answered in person. The messages or prompts, which are supplied to the calling party, are selected by the calling party (after the first message) and no optional message control is made by the called party.

Other systems have been designed to relieve telephone operators from the drudgery of repeatedly answering a telephone with the same message. The Winter et al. U.S. Pat. No. 4,697,282, and Quiros et al. U.S. Pat. No. 4,734,930, disclose a synthesized voice response to the initial call, following which the operator on duty (or any person) proceeds with a "live" interchange with the calling party. The pre-recorded or synthesized voice is the same voice as the operator; so that, theoretically at least, the calling party is not able to detect the difference between the pre-recorded message and the actual live response which subsequently follows.

The called station of Winter has a number of different pre-recorded responses, which are utilized in responding to incoming calls. The operator is on line the entire time, and actually effects the answering of the called party telephone. After the calling party initiates an interchange, the operator selects the desired message response, which is to be retrieved from memory, and plays it back to the calling party. When the calling party speaks again, the operator, who has been on line via a conventional telephone the entire time, proceeds to converse with the caller. The operator, however, is relieved of making the actual initial voice responses, because of the ability to select pre-recorded responses to the initial query from the calling party.

The system disclosed in the Quiros patent is similar to Winter in the overall technique which is employed. As with Winter, the system of Quiros has the operator on line monitoring the entire call. The initial response, however, is effected by a stored message. There is no operator-selectable response message, but only a single pre-recorded message for the initial response to the calling party. The operator then takes over, after this initial response has been made.

The systems of Winter and Quiros, described above, which include an operator on line during the time the pre-recorded messages are being played back over the line, are subject to the disadvantage of picking up extraneous background sounds from the microphone of the operator's telephone. Consequently, if the environment in which the operator or answering party is located is a noisy one, this noise is transmitted over the phone line, along with the desired message. For a home, or a business operated out of the home, where distracting background noise, such as the blaring of a television set, crying children, or the like, may exist, the pick up and transmission of background noise by the telephone microphone frequently is undesirable.

A system which simulates the function of a live operator, and which overcomes the disadvantages of the Winter and Quiros systems, is disclosed in the Ferrara U.S. Pat. No. 5,189,692. In the system of the Ferrara patent, a telephone operator simulator system interfaces with incoming calls on the telephone line. The system includes a voice and signal storage memory. A control device is connected to the storage memory and the telephone line, and operates to deliver selected response messages from the storage memory to the telephone line.

In the Ferrara system, the messages are selected manually by means of a key pad connected to the control device to cause the memory to supply the selected response message from the storage to the telephone line. The called party may monitor the calling party voice and the response messages. Additional response messages then are selected by the called party, as required in response to the replies from the calling party. Following the sequence of response messages and calling party replies, the called party then goes "off-hook" through a telephone receiver to engage in normal two-party conversation from that point out. The messages, which are stored and which are used in the initial answering of the called party telephone, comprised voice synthesized messages, as well as sound simulations such as background sounds, intercom ring backs, and the like; so that the impression which is given to the calling party is that of a business or location where a separate operator first handles the calls, and then either transfers the calls to the called party, or the sequence of pre-recorded response messages can be used to terminate the call. The result is that the system provides a professional image to the calling party, and the capability of screening incoming calls.

Even with the system of the Ferrara U.S. Pat. No. 5,189,692, however, a problem exists when the called party is not at the telephone location with which the system is associated. For example, if the business person or called party is on the road (leaving the office unattended), the system of Ferrara U.S. Pat. No. 5,189,692 does not function, since that system requires the physical presence of the called party to monitor the requests from the caller, and to react by pushing selection buttons on a key pad to generate the pre-recorded messages.

Consequently, even if a business person has a system of the type mentioned above in the Ferrara patent, when that business person is on the road, it is necessary to rely on less than optimal solutions. A return to the answering machine may be used. The image of a business which is projected by an answering machine, however, is not a good one. In addition, a large percentage of people do not leave messages on an answering machine or on a voice mail system. Another option is to use an answering service. Answering services, however, are typically hurried, expensive and impersonal; and most of them only take messages. Answering services that patch calls through to a remote location generally are quite expensive. A third option is to utilize "call forwarding". In this type of system, the call to the unattended office or unattended telephone line is diverted to a remote location, or to a cellular phone. The advantages of the system of the Ferrara U.S. Pat. No. 5,189,692 then are lost, since the called party is not at the physical location of that system to effect the pre-recorded responses.

Accordingly, it is an object of this invention to provide a telephone operator simulation system, which has the advantages of the Ferrara patent mentioned above, and further, which can be controlled and operated from a remote location.

SUMMARY OF THE INVENTION

It is an object of this invention to provide an improved telephone operator simulator system.

It is another object of this invention to provide an improved telephone operator simulator system for supplying pre-recorded response messages and sounds to a calling party under the manual control of the called party.

It is an additional object of this invention to provide an improved operator simulator system for supplying pre-recorded response messages and sounds to a calling party, under manual control of the called party, from a remote location to which calls may be forwarded or diverted.

In accordance with a preferred embodiment of the invention, a telephone operator simulator system may be operated from a remote location, to which an incoming call has been forwarded from a first telephone line to a second telephone line. This is accomplished by providing a voice and signal storage memory at the called party location. A control circuit is connected to the storage memory and the telephone line to deliver selected response messages from the storage memory to the telephone line. Call originating circuitry also is coupled with the control circuit, and is operated to automatically reach a remote telephone set on a second telephone line in response to enabling operation of the control circuit by a ring detector at the first line. First and second duplexers are coupled with the first and second telephone lines, respectively, for splitting the incoming and outgoing signals. At the second or call forwarded line, the telephone may be answered in its normal manner. Outgoing signals from the second line, however, can be blocked by a multiplex circuit coupled with the operator simulator system at the first called party line. This permits operation of the touch-tone key pad at the second line, to transmit signals back to the control circuit for selecting desired response messages to be supplied from the storage memory through the multiplex circuit to the calling party. Replies from the calling party are allowed to pass through the first and second duplexers; so that they may be heard by the called party at the remote location. Additional operations of the touch-tone key pad on the remote called party telephone are supplied back to the control circuit to effect the selection of additional desired response messages which are supplied through the multiplex circuit and the duplexer to the calling party. After the called party has sequentially selected the proper number and type of pre-recorded response messages, a button or key is pressed on the touch-tone key pad to cause the control circuit to disconnect the voice and signal storage memory from the multiplexer, and to permit the multiplexer to pass outgoing signals from the remote telephone line on through to the calling party line. Full duplex conversation of a normal type then takes place.

DETAILED DESCRIPTION

Figure 1:
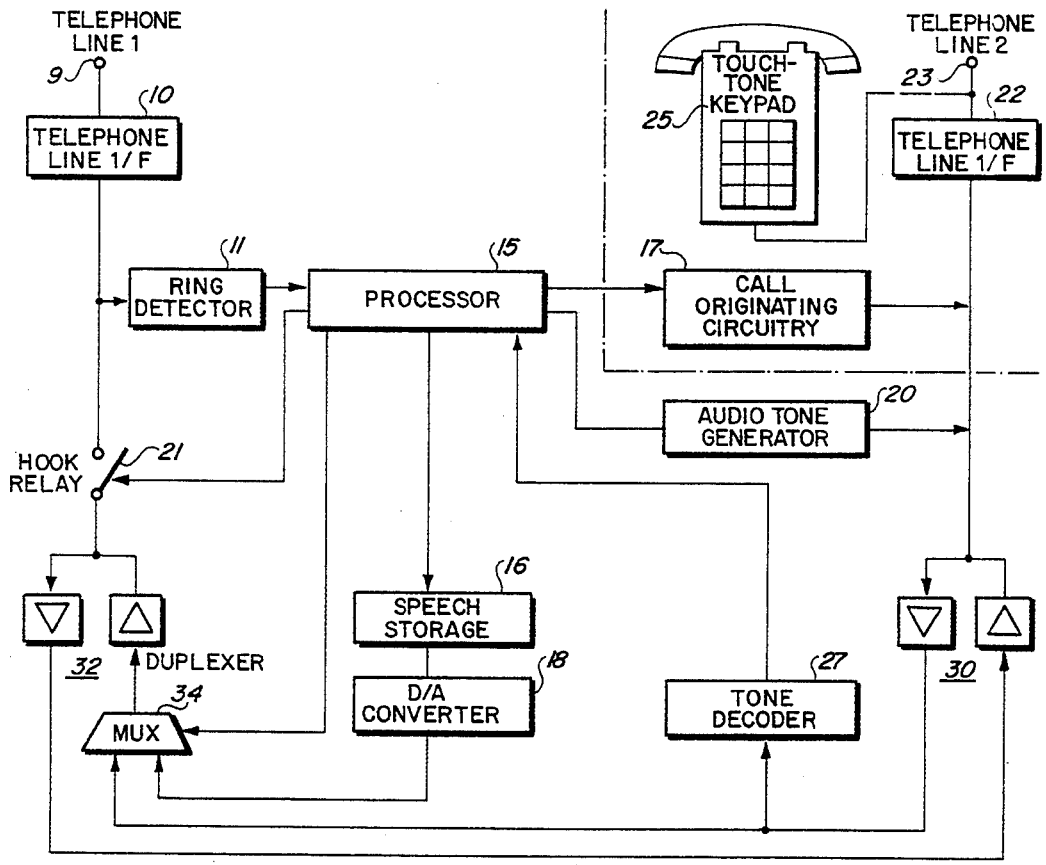
FIG. 1 is a schematic diagram of the preferred embodiment of the invention.

Reference now should be made to FIG. 1 of the drawing. The system is illustrated as connected to a first or incoming telephone line 9. The interconnection is effected through a telephone line interface (I/F) 10, which comprises the usual protection circuitry and line control relays. The system at the called party location includes a ring detector 11 for responding to the presence of ringing signals on the telephone line 9. The ring detector 11 produces an input to a control circuit microprocessor 15, which interfaces to communicate with a digital voice and signal storage read-only memory (ROM) 16.

In the system disclosed, the control circuit microprocessor 15 is used to establish a pre-programmed "call forward" relay of the incoming telephone call to a remote telephone location. This is effected by a "call originating circuit" 17 which may operate by ringing down a cordless phone, activating a "hot-line", or by means of a dialer. The call originating circuit 17 may be of a variety of different forms depending on the particular application. It may be a touch-tone dialer, a rotary dialer, a ring generator, tie line, etc. The call originating circuit 17 is operated by the microprocessor 15 in response to detection of a ring signal from the ring detector 11 to cause the circuit 17 to reach the remote telephone set to which the call is to be forwarded. The remote telephone interconnection is effected through a telephone line interface (I/F) 22 for the second telephone line 23. The telephone on the line 23 is answered in the normal manner. A tone or other special audio signal from the processor 15 is supplied on the second phone line 23, by means of an audio tone generator 20, to indicate to the person answering the telephone that the control circuit microprocessor 15 is on line to provide the telephone operator simulation. The party at the remote telephone then operates a pre-established one of the keys on the touch-tone key pad 25 of the telephone at that location to send a "command tone" signal back through the incoming portion of a duplexer 30 to the microprocessor 15 indicating that the called party is ready to monitor the call. The microprocessor 15 then operates (closes) the "off-hook" relay 21 and greets the caller with a first message (voice or non-voice sounds) selected by the processor 15 from the signal storage memory 16.

The storage memory 16 has several address locations in it, in which synthesized voice phrases or specific response messages are stored. Examples of such phrases are: "ABC Marketing, may I help you?", or "Thank you, please hold", or "Thank you, I'll connect you with Mr. Jones". In addition, the memory 16 also has digitally synthesized background sounds, of the type which typically exist in the area around a receptionist's desk, such as typewriter noises, air conditioner blowers, or the like. The background sounds are capable of being played back at low volume by the system. In addition, other background sounds, such as a PBX ring-back tone, synthesized music playback, or the like, may be provided for reasons developed more fully in the subsequent description.

The control circuit microprocessor 15 supplies address signals to the memory 16, as selected by the touch-tone key pad 25 at the remote telephone. These touch-tone signals are decoded by the touch-tone decoder 27 (operating as a control signal decoder) to provide the control signals for operating the microprocessor 15. The synthesized response messages (whether these are short voice messages or background sounds, as described above) from the signal storage memory 16 then are supplied to a digital-to-analog decoder 18 and, if necessary, through an additional amplifier, to the first input of a two-input multiplex circuit 34, the output of which is connected with the output portion of a duplexer 32 to the telephone line 9.

The microprocessor 15 operates the multiplex circuit 34 to cause the signals from the digital-to-analog decoder circuit 18 to be supplied from its first input (right-hand) through it and the duplexer 32 to the telephone 9 through the interface 10. Consequently, the synthesized response messages and background sounds, which are obtained from the storage memory 16, are heard by the calling party on the telephone line 10. These sounds, as well as the voice of the calling party, are heard by the person who answered the telephone on line 23 at the remote location. This permits the called party to monitor the operation of the system on the remote line 23.

When the calling party replies to the response message from the storage memory 16, that reply is passed through the incoming portion of the duplexer 32 and through it, through the outgoing portion of the duplexer 30, to the called party on the remote line 23. It should be noted that so long as the system is in this state of operation, no sounds from the microphone of the telephone receiver at the remote line 23, or from the touch-tone key pad 25, located on that line, are passed through to the calling party on line 9, since the incoming sounds from the duplexer 30 are supplied to the second input (left input) of the multiplex circuit 34. At this time, however, the second input of the multiplex circuit 34 is blocked or disconnected; and the only sounds supplied back to the called party on line 9 are those obtained from the signal storage memory 16 and the digital-to-analog decoder 18. As a result, if the reply from the calling party is one to which an additional pre-recorded message response is to be made, the called party presses a different key or button on the touch-tone key pad 25 to supply a new control signal through the touch-tone decoder 27 to the control circuit microprocessor 15. The microprocessor 15 then addresses the appropriate memory in the signal storage memory 16 to initiate the delivery of an additional response message through the first input of the multiplex circuit 34 and the outgoing portion of the duplexer 32 to the called party.

When no further response messages are to be sent by the system, the called party operates a final predetermined button or key on the touch-tone key pad 25 to switch over the telephone interconnections to be a direct voice connection between the two telephone lines. This switchover tone, however, is not heard by the calling party, since the multiplex circuit 34 still blocks the incoming portions of the signal from the duplexer 30, and prevents them from being supplied through the outgoing portion of the duplexer 32 to the calling party line 9. This "switchover" signal, however, is processed by the touch-tone decoder 27 and is supplied to the control circuit microprocessor 15. A signal then is supplied by the control circuit microprocessor 15 to the multiplex circuit 34 to switch it to interconnect the second or left-hand one of its two inputs (the one from the incoming side of the duplexer 30) to its output.

At the same time, no further signals from the signal storage circuit 16 and the digital-to-analog decoder circuit 18 can be passed through the multiplex circuit 34. In this mode of operation, those signals are blocked. When this occurs, normal two-way voice conversation between the calling party on line 9 and the called party on the remote "call forwarded" line 23 takes place. The signal storage memory 16 and digital-to-analog decoder 18 effectively are switched out of the circuit at this time, the calling party is completely unaware that the initial portion of the conversation, that is, the "operator" interface portion, was effected by means of the pre-recorded message system. As far as the calling party is concerned, all of the different portions of the conversation have taken place at the same location. This operation permits a very businesslike handling of the call, in contrast to the situation which would exist for a conventional "call forwarding" system used to forward calls from an unattended location or number.

At the end of the call, when the called party decides to disconnect, a "control tone" is entered on the touch-tone key pad 25. This tone is decoded by the decoder 27 to cause the control circuit microprocessor 15 to place both telephone lines 9 and 23 in the "on-hook" condition (i.e. idle state). The system then is prepared for receipt and forwarding of the next call.

Figure 2:
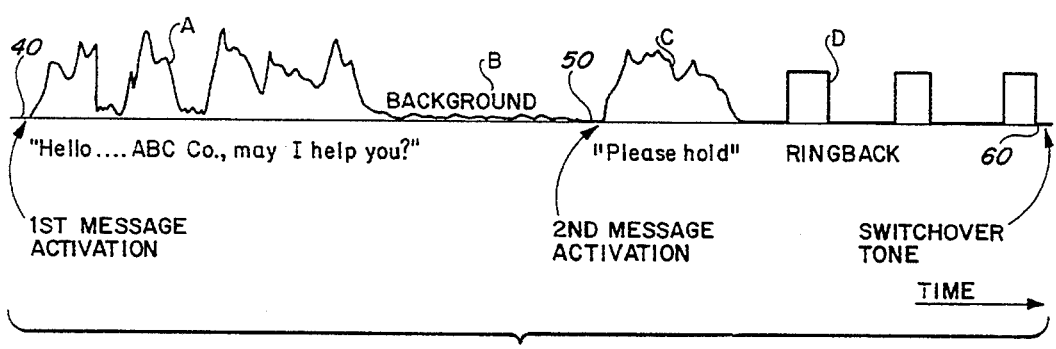
FIG. 2 is a waveform representation of an operating sequence, useful in describing the operation of the system shown in FIG. 1.

Reference now should be made to FIG. 2 for an understanding of the manner of operation of the system of FIG. 1 in a typical situation. Assume that a calling party has dialed the telephone number connected to the line 9. A ringing signal is detected by the ring detector 11 to enable the microprocessor 15 for operation. As described previously, this first sequence, for an unattended location, causes the microprocessor 15 to operate the call originating circuit 17 to access the remote location where the call is to be taken. Once the party on the remote line 23 has responded, as described above, the microprocessor is enabled, as described previously, to initiate the "first message activation" indicated in FIG. 2 at point 40. This is effected, as described, either automatically or by depressing a selected one of the buttons on a touch-tone key pad 25 at the remote location.

When the first message activation is effected, the microprocessor 15 interfaces with the digital voice and signal storage memory 16 to select the first response message. This response message is shown in waveform A of FIG. 2 as "Hello ... ABC Company ... may I help you?"

Because this first response message ends in a question, and most initial response messages will end in a question, a response from the calling party is expected. Since there is no microphone to pick up any background sounds in the system of FIG. 1, the termination of the message portion A could leave the line 9 with a very flat or "dead" sound level on it during the time the response from the calling party is expected. Consequently, in the preferred embodiment of the system, a second "background noise" response signal B is generated from the signal storage unit 16, and is supplied to the line 9 through the multiplex circuit 34 and outgoing portion of the duplexer 32 to the line 9. This second response signal is continuously reproduced by appropriate cycling algorithms to provide a realistic background for the receiver at the calling party end of the communication during the time the calling party is responding to the first response message question. Both this background noise portion B and the calling party response are supplied through the duplexers 32 and 30 to the called party on line 23 to permit the called party to monitor the calling party's response.

At the conclusion of the calling party's response, a second push-button or key on the touch-tone key pad 25 is activated by the called party at the remote telephone line 23 to generate a second response message. This signal is decoded by the decoder 27, and supplied to the control circuit microprocessor 15, as described previously. In the example shown in FIG. 2, this second response message C, starting at 50, comprises two words: "Please hold". Once again, the system follows this second voice response with an automatic continuously recycling pattern. This is shown in FIG. 2 as the ring-back pattern D, at the termination of the synthesized voice message of waveform C.

The pattern D continues until the called party decides to engage in a live conversation (at 60 in FIG. 2). The called party then operates a third predetermined push-button or key on the touch-tone key pad 25 to supply a switchover signal through the decoder 27 to the control circuit microprocessor 15. This signal causes the control microprocessor 15 to switch the multiplex circuit 34 from a position which interconnects the output of the digital-to-analog decoder 18 with the outgoing portion of the duplexer 32 to one where the second input of the multiplex circuit 34 (which is connected to the incoming portion of the duplexer 30) is interconnected through its output to the output portion of the duplexer 32. In this state of operation, normal two-way voice conversation between the calling party on line 9 and the called party on the "call forwarded" line 23 takes place.

It should be noted that the system described above is a variation of, and an improvement on, the system of Ferrara U.S. Pat. No. 5,189,692. This system includes features which are added to the system of that patent to permit operation from a remote location, as a result of a "call forwarding" type of operation. The system described above in conjunction with FIG. 1 is for situations where the called party office or location, in which the telephone operator simulator system is located, is unattended. Obviously, if that location is attended, the system is operated in the same manner described in U.S. Pat. No. 5,189,692. The improvement, which is provided by the above system, however, permits the control of the operator simulator system to be effected from any telephone to which the call is forwarded from the unattended office where the operator simulator system is located. The flexibility of the system and the types of messages and sequences, which can be provided from the system of FIG. 1, are the same as those which are provided from the system of U.S. Pat. No. 5,189,692.

The foregoing description of the preferred embodiment of the invention should be considered as illustrative, and not as limiting. Various changes and modifications will occur to those skilled in the art without departing from the true scope of the invention as defined in the appended claims.

I claim:

1. A telephone operator simulator system operated from a remote location, to which an incoming call has been forwarded from a first telephone line to a second telephone line connected to a remote telephone set, including in combination:

a first duplexer coupled with said first telephone line having incoming and outgoing signal portions for splitting incoming and outgoing signals;

a multiplex circuit having an output coupled with the outgoing signal portion of said first duplexer and having first and second inputs;

storage means for storing at least first and second predetermined response messages, and having an output coupled to the first input of said multiplex circuit;

a control circuit coupled to said multiplex circuit for controlling the connection of the first and second inputs of said multiplex circuit with the output thereof, said control circuit further coupled with said storage means for operating said storage means to deliver predetermined response messages to the first input of said multiplex circuit;

a ring detector coupled with said first telephone line for enabling said control circuit for operation;

a call originating circuit coupled with said control circuit and operated thereby for automatically seizing said second line to reach said remote telephone set over said second line in response to enabling operation of said control circuit by said ring detector;

a second duplexer coupled with said second telephone line for splitting incoming and outgoing signals, with the outgoing signal portion of said second duplexer connected with the incoming signal portion of said first duplexer, and with the incoming signal portion of said second duplexer coupled with said second input of said multiplex circuit; and a control signal decoder coupled with the incoming signal portion of said second duplexer for receiving signals therefrom, and further coupled with said control circuit to cause said control circuit to operate said storage means causing said storage means to deliver a selected predetermined response to said multiplex circuit in accordance with signals decoded by said control signal decoder.

2. The combination according to claim 1 further including a control signal generator coupled with said second telephone line for supplying control signals through the incoming signal portion of said second duplexer to said control signal decoder, with a predetermined one of said control signals causing said control circuit to operate said multiplex circuit for coupling the second input of said multiplex circuit to the output thereof, and disconnecting the first input of said multiplex circuit from the output thereof.

3. The combination according to claim 2 wherein said signal generator is the touch-tone key pad of said remote telephone set, and said control signal decoder decodes the signals generated by said touch-tone key pad.

4. The combination according to claim 3 wherein said control circuit initially is enabled by said ring detector in response to an incoming call on said first telephone line to cause the first input of said multiplex circuit to be connected with the output thereof; so that signals applied to the second input of said multiplex circuit do not pass therethrough.

5. The combination according claim 4 wherein said control circuit comprises a microprocessor; said storage means comprises a digital storage of synthesized voice phrases and sounds, located in a read-only memory (ROM); and said control signal decoder causes said control circuit to supply different predetermined addresses to said memory to cause selected response messages to be supplied from said memory to the first input of said multiplex circuit.

6. The combination according to claim 5 wherein said storage means stores predetermined voice messages and non-voice sound patterns.

7. The combination according to claim 6 wherein said non-voice response messages comprise a plurality of non-voice response messages, with predetermined different ones of said non-voice response messages automatically being supplied from said storage means by said control circuit following the selection of different predetermined voice response messages in the operation of said storage means by said control circuit in response to said control signal decoder.

8. The combination according to claim 1 wherein said control circuit initially is enabled by said ring detector in response to an incoming call on said first telephone line to cause the first input of said multiplex circuit to be connected with the output thereof; so that signals applied to the second input of said multiplex circuit do not pass therethrough.

9. The combination according claim 8 wherein said control circuit comprises a microprocessor; said storage means comprises a digital storage of synthesized voice phrases and sounds, located in a read-only memory (ROM); and said control signal decoder causes said control circuit to supply different predetermined addresses to said memory to cause selected response messages to be supplied from said memory to the first input of said multiplex circuit.

10. The combination according to claim 9 wherein said storage means stores predetermined voice messages and non-voice sound patterns.

11. The combination according to claim 10 wherein said non-voice response messages comprise a plurality of non-voice response messages, with predetermined different ones of said non-voice response messages automatically being supplied from said storage means by said control circuit following the selection of different predetermined voice response messages in the operation of said storage means by said control circuit in response to said control signal decoder.

12. The combination according claim 1 wherein said control circuit comprises a microprocessor; said storage means comprises a digital storage of synthesized voice phrases and sounds, located in a read-only memory (ROM); and said control signal decoder causes said control circuit to supply different predetermined addresses to said memory to cause selected response messages to be supplied from said memory to the first input of said multiplex circuit.

13. The combination according to claim 1 wherein said storage means stores predetermined voice messages and non-voice sound patterns.

14. The combination according to claim 13 wherein said non-voice response messages comprise a plurality of non-voice response messages, with predetermined different ones of said non-voice response messages automatically being supplied from said storage means by said control circuit following the selection of different predetermined voice response messages in the operation of said storage means by said control circuit in response to said control signal decoder.

* * * * *